United States Patent
Li et al.

(10) Patent No.: US 9,824,258 B2
(45) Date of Patent: Nov. 21, 2017

(54) METHOD AND APPARATUS FOR FINGERPRINT IDENTIFICATION

(71) Applicant: Shenzhen Goodix Technology Co., Ltd., Shenzhen (CN)

(72) Inventors: Hongsheng Li, Shenzhen (CN); Hongwei Xu, Shenzhen (CN); Jinchun Ye, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 28 days.

(21) Appl. No.: 15/202,574

(22) Filed: Jul. 6, 2016

(65) Prior Publication Data

US 2016/0314338 A1  Oct. 27, 2016

Related U.S. Application Data

(63) Continuation of application No. PCT/CN2014/088491, filed on Oct. 13, 2014.

(30) Foreign Application Priority Data

Aug. 14, 2014  (CN) .......................... 2014 1 0401491

(51) Int. Cl.
*G06K 9/00* (2006.01)
*G06K 9/34* (2006.01)
*G06K 9/62* (2006.01)

(52) U.S. Cl.
CPC ........... *G06K 9/00093* (2013.01); *G06K 9/00* (2013.01); *G06K 9/00073* (2013.01); *G06K 9/34* (2013.01); *G06K 9/6212* (2013.01); *G06K 9/6215* (2013.01)

(58) Field of Classification Search
CPC .. G06K 9/00073; G06K 9/00093; G06K 9/00; G06K 9/00087; G06K 9/6215;
(Continued)

(56) References Cited

U.S. PATENT DOCUMENTS

| 5,613,014 | A | 3/1997 | Eshera et al. |
| 6,546,122 | B1 | 4/2003 | Russo |

(Continued)

FOREIGN PATENT DOCUMENTS

| CN | 1912889 A | 2/2007 |
| CN | 101499130 A1 | 8/2009 |

(Continued)

OTHER PUBLICATIONS

Office action with search report for the corresponding CN patent application No. 201410401491.0, Applicant: Shenzhen Huiding Technology Co., Ltd., dated Dec. 1, 2016, 7 pages.

(Continued)

*Primary Examiner* — Kim Vu
*Assistant Examiner* — Michael Vanchy, Jr.

(57) ABSTRACT

The present disclosure applies to the field of biometric identification technologies and provides a method and an apparatus for fingerprint identification. The method includes: extracting a minutia of the input fingerprint image by using a statistical method; performing fingerprint matching according to the extracted minutia to obtain a fingerprint identification result. According to the method provides in embodiments of the present disclosure, the direction of the minutia is calculated by using statistical information, a descriptor with statistical significance is added for the minutia, and during the matching process, calculation of the similarity of the minutia by using the descriptor and region matching by using information of the direction field and the gradient field of the overlapping region are added, therefore, (Continued)

instability and weak specificity of expression of fingerprint characteristics in a conventional algorithm are avoided, and accuracy of the fingerprint identification is improved.

6 Claims, 12 Drawing Sheets

(58) Field of Classification Search
CPC .. G06K 9/00067; G06K 9/0008; G06K 9/001; G06K 9/0061; A61B 5/1172; G06F 21/32
See application file for complete search history.

(56) References Cited

U.S. PATENT DOCUMENTS

| | | | |
|---|---|---|---|
| 8,326,003 | B2 | 12/2012 | Jang |
| 2005/0105783 | A1 | 5/2005 | Dae Moon et al. |
| 2009/0154780 | A1 | 6/2009 | Jang |
| 2014/0093146 | A1* | 4/2014 | Inanc ............... G06K 9/00073 382/125 |
| 2015/0286855 | A1 | 10/2015 | Neskovic et al. |

FOREIGN PATENT DOCUMENTS

| | | |
|---|---|---|
| CN | 101515286 A | 8/2009 |
| CN | 102663401 A1 | 9/2012 |
| CN | 103020945 A | 4/2013 |
| CN | 101030246 A | 10/2013 |
| CN | 103425986 A | 12/2013 |
| CN | 104156707 A | 11/2014 |
| EP | 2071524 A1 | 6/2009 |
| GB | 2507539 A | 5/2014 |
| JP | 2004-213395 A | 7/2004 |
| KR | 10-0617292 B1 | 8/2006 |
| WO | 96/12246 A1 | 4/1996 |

OTHER PUBLICATIONS

Office action for the corresponding KR patent application No. 10-2016-7021522, Applicant: Shenzhen Huiding Technology Co., Ltd., dated Jun. 2, 2017, 12 pages.
Partial Supplementary European Search Report for the corresponding EP patent application No. 14899701.8, Applicant: Shenzhen Huiding Technology Co., Ltd., Jul. 6, 2017, 8 pages.
Feng et al., "Combining minutiae descriptors for fingerprint matching", Pattern Recognition, Elsevier, GB, vol. 41, No. 1, pp. 342-352, XP022208730, ISSN: 0031-3203, DOI:10.1016/J. PATCOG. Apr. 16, 2007, Aug. 23, 2007.
Jia et al., "A Fingerprint Minutiae Matching Approach Based on Vector Triangle Method and Ridge Structure," Communications, Circuits and Systems, 2004, Piscataway, NJ, USA, IEEE, US, pp. 871-875, vol. 2, XP010732044, DOI:10.1109/ICCCAS.2004. 1346319 ISBN: 978-0-7803-8647-1, Jun. 27, 2004.
International Search Report for International Application No. PCT/CN2014/088491, Applicant: Shenzhen Huiding Technology Co., Ltd., May 8, 2015, 2 pages.

* cited by examiner

METHOD AND APPARATUS FOR FINGERPRINT IDENTIFICATION

CROSS-REFERENCE TO RELATED APPLICATIONS

This application is a continuation of International Application No. PCT/CN2014/088491, filed on Oct. 13, 2014, which claims priority to Chinese Patent Application No. 201410401491.0, filed on Aug. 14, 2014, both of which are hereby incorporated by reference in their entireties.

TECHNICAL FIELD

The present disclosure belongs to the field of biometric identification technologies, and in particular, to a method and an apparatus for fingerprint identification.

BACKGROUND

With rapid development of science and technology and internet technology, some network resources are applied more frequently, personal information is increasingly input on the network, and leakage of the personal information has always been a problem to be solved. Biometric identification technology has attracted more and more attentions in recent years since a fingerprint has uniqueness and stability. A conventional method for fingerprint identification is as shown in FIG. 1, which includes fingerprint preprocessing, fingerprint minutia extracting, fingerprint registration and matching; where when a fingerprint minutia is extracted, in order to add information of the minutia, besides that a position and a direction of the minutia are recorded, three parameters which represent directions of three vertexes of a regular triangle taking the minutia as a center and a fixed value as a circumradius are added, so that a conventional expression structure of the minutia is [(x y) $\theta_a$ $\theta_b$ $\theta_c$], where $\theta_a$, $\theta_b$, $\theta_c$ represent the directions of the three vertexes around the minutia respectively. However, a fingerprint is easy to distort and stability and specificity of the above-mentioned conventional expression of the minutia are not better enough, which causes that subsequent registration and matching are not accurate.

SUMMARY

The present disclosure provides method and apparatus for fingerprint identification.

An embodiment of the present disclosure provides a method for fingerprint identification, the method includes extracting a minutia of an input fingerprint image by using a statistical method; and performing fingerprint matching according to the extracted minutia to obtain a fingerprint identification result.

Another embodiment of the present disclosure provides an apparatus for fingerprint identification, comprising an extracting module, configured to extract a minutia of an input fingerprint image by using a statistical method; and a matching module, configured to perform fingerprint matching according to the extracted minutia to obtain a fingerprint identifying result.

Another embodiment of the present disclosure provides an apparatus for fingerprint identification, comprising a processor, wherein the processor is configured to extract a minutia of an input fingerprint image by using a statistical method; and perform fingerprint matching according to the extracted minutia to obtain a fingerprint identifying result.

DETAILED DESCRIPTION

In order to make objectives, technical solutions and advantages of the present disclosure clearer, a further detailed description on the present disclosure will be given below in combination with accompanying drawings and embodiments. It should be understood that, specific embodiments described herein are merely used for illustrating the present disclosure, rather than limiting the present disclosure.

Embodiment 1

Figure 1:
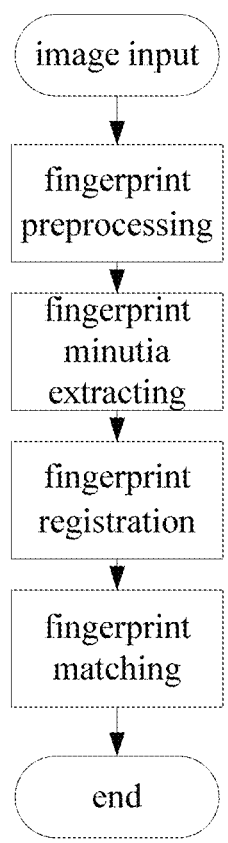
FIG. 1 is a flowchart of an existing method for fingerprint identification.
Figure 2:
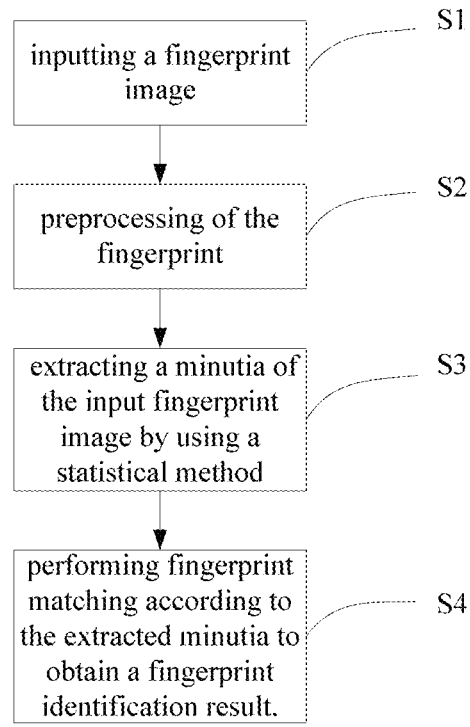
FIG. 2 is a flowchart of a method for fingerprint identification according to a first embodiment of the present disclosure.

Embodiment 1 of the present disclosure provides a method for fingerprint identification. As shown in FIG. 2, the method of embodiment 1 of the present disclosure includes the following steps.

S1, inputting a fingerprint image.

Figure 3:
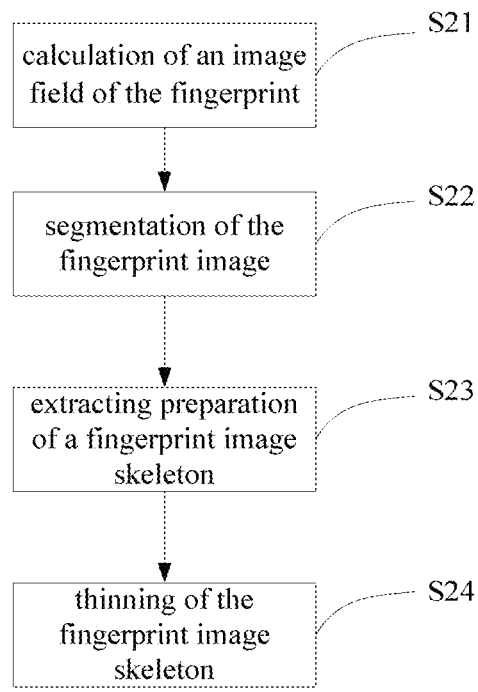
FIG. 3 is a flowchart of fingerprint preprocessing in the method for fingerprint identification according to the first embodiment of the present disclosure.

S2, preprocessing of the fingerprint, i.e., preprocessing the input fingerprint image before a practical application and transforming the input fingerprint image into a desired form, as shown in FIG. 3, including steps:

S21, calculation of an image field of the fingerprint.

In order to indentify a fingerprint part of the input image, the image field is first analyzed. The image field includes an intensity field, a gradient field and a direction field and the like. The so-called intensity field reflects information of brightness intensity of certain point of a fingerprint image; the so-called gradient field is a direction that a function increases in a fastest speed, where the gradient is a vector and an expression of the gradient may be expressed as:

$$\nabla f = \left( \frac{\partial f}{\partial x}, \frac{\partial f}{\partial y} \right).$$

In the fingerprint image, the gradient illustrates a direction that a fingerprint line is steepest, an amplitude of the gradient may illustrate a degree that the fingerprint line is steepest, and a direction of the gradient refers to a direction of the fingerprint line. Line information of the whole fingerprint may be obtained by calculating the gradient field of the fingerprint image. The direction field reflects an intensity that the fingerprint revolves around a center, which is a quite important physical parameter in the fingerprint image.

S22, segmentation of the fingerprint image.

The segmentation of the fingerprint image means that fingerprint part is extracted from the fingerprint image, i.e., segmenting a background from a foreground of the fingerprint. Since the intensity field and the gradient field of the image have been calculated in step S21, the background and the foreground of the fingerprint may be distinguished by analyzing the intensity field and the gradient field.

S23, extracting preparation of a fingerprint image skeleton.

The so-called extracting preparation of the fingerprint image skeleton means to perform binarize on the image. Since a pixel difference between a texture and the background of the fingerprint image is relatively distinct, we may select a threshold $\delta$, and as for a pixel on the fingerprint image:

$$B(i, j) = \begin{cases} 255 & f(i, j) >= \delta \\ 0 & f(i, j) < \delta \end{cases}.$$

S24, thinning of the fingerprint image skeleton.

A general algorithm such as a thinning algorithm look-up table method or the like may be employed, and will not be repeated redundantly herein.

S3, extracting a minutia of the input fingerprint image by using a statistical method.

Figure 4:
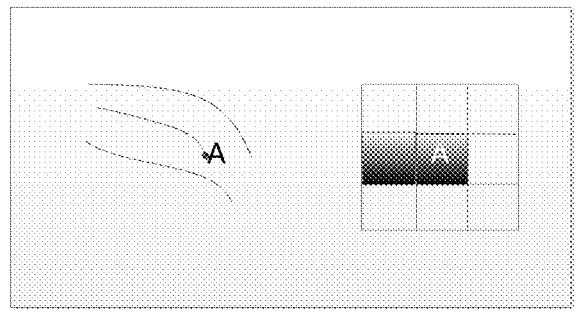
FIG. 4 is a schematic diagram of an endpoint in the method for fingerprint identification according to the first embodiment of the present disclosure.
Figure 5:
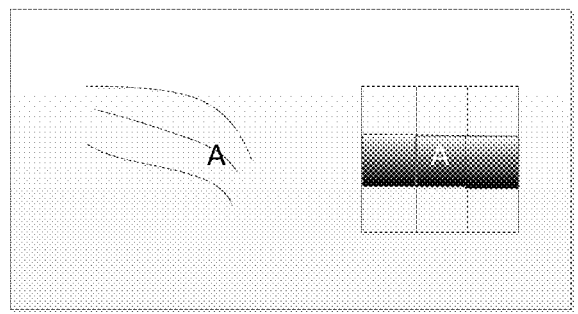
FIG. 5 is a schematic diagram of a non-endpoint minutia in the method for fingerprint identification according to the first embodiment of the present disclosure.

The fingerprint image obtained from preprocessing of the fingerprint in step S2 is a fingerprint form on which minutia extracting may be performed. However, the whole image includes a lot of useless information, so that some minutiae with a typical characteristic, i.e., characteristic points, need to be extracted from the fingerprint image by using a method of characteristic extracting. A minutia is a quite typical fingerprint characteristic point and it has many types, such as a bifurcation point, an endpoint and a singular point and the like. For different types of minutiae, extracting methods are different. Taking an endpoint as an example, for extracting of the endpoint, as shown in FIG. 4, change of a pixel value of a fingerprint image is used. In FIG. 4, black pixel points are fingerprint lines of a fingerprint and white pixel points are background part. It may be seen from FIG. 4 that, point A is an endpoint, so that one of eight pixel points in the neighborhood of the point A has a pixel value of 0. Since the whole image is a binary (0 or 255) image, an absolute value of a difference between adjacent pixels within a whole template is 0 or 255. Based on the above case, it may be seen that, a sum of the absolute values of the differences between adjacent pixels within the whole template is 2*255. However, if it is not an endpoint, as shown in FIG. 5, at least three pixel points with pixel value of 0 are included. Therefore, the endpoint of the image may be obtained by performing a statistics on a sum of differences between adjacent pixels within the neighborhood of each pixel point within the fingerprint image.

Figure 6:
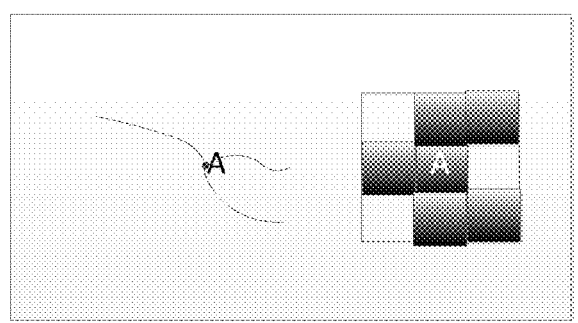
FIG. 6 is a schematic diagram of a bifurcation point in the method for fingerprint identification according to the first embodiment of the present disclosure.

An extracting of a bifurcation point may use a same extracting strategy as that of the endpoint. It may be found by an analysis that, an image pixel distribution within a neighborhood of the bifurcation point of the fingerprint image is shown in FIG. 6, i.e., a bifurcation point where one line is bifurcated into three or more lines does not exist in a fingerprint of a person. It may be obtained by calculation that a sum of absolute values of differences between adjacent pixels within the neighborhood of A is 6*255, so that the bifurcation point may be obtained according to such property by traversing the whole image.

A singular point of a fingerprint includes two types: a triangle point and a center point. The singular point of the fingerprint does not have a local pixel distribution property as that of the endpoint and the bifurcation point. Extracting of the singular point is obtained by calculating a surrounding direction field, which has been a mature method, and will not be repeated redundantly herein.

Figure 7:
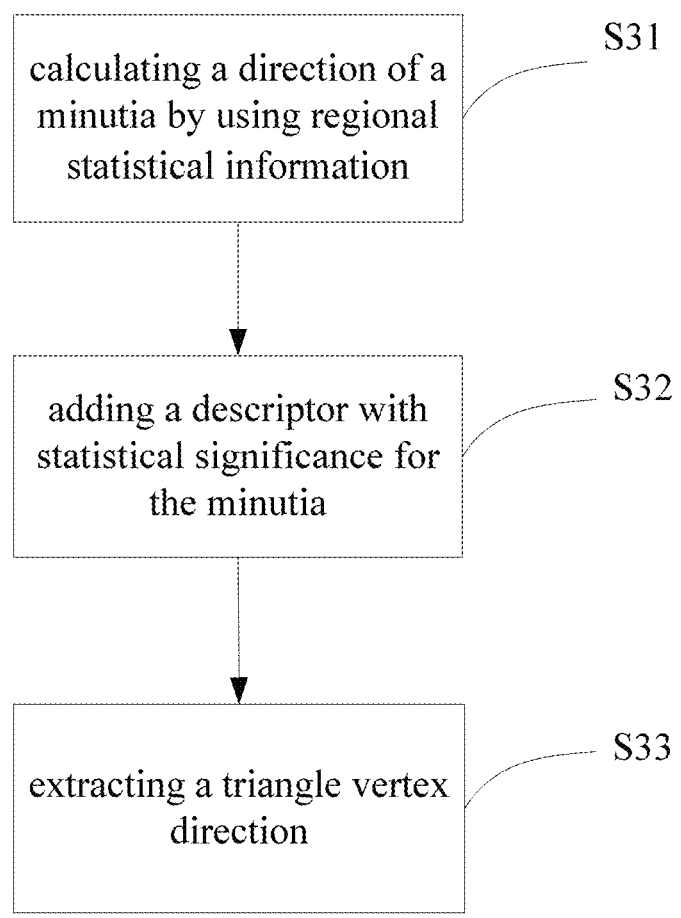
FIG. 7 is a flowchart of an expression of fingerprint characteristic in the method for fingerprint identification according to the first embodiment of the present disclosure.

As shown in FIG. 7, embodiment 1 of the present disclosure expresses fingerprint characteristics in the following manner.

Figure 8:
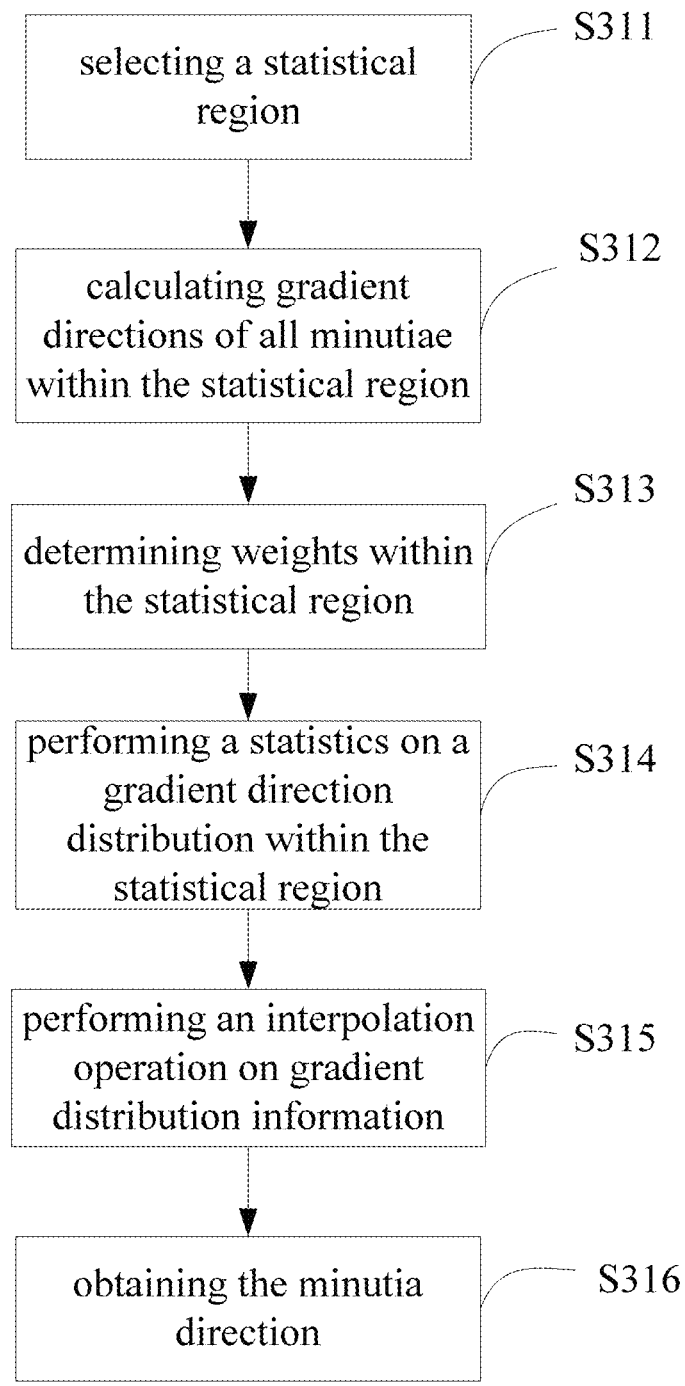
FIG. 8 is a flowchart of calculating a direction of a minutia in the method for fingerprint identification according to the first embodiment of the present disclosure.

Step S31, calculating a direction of a minutia by using regional statistical information. In order to extract a descriptor and determine rotation of a splicing process subsequently, each minutia needs a stable direction. The so-called stable direction means a direction capable of representing a direction of the point. A conventional algorithm takes a gradient direction of a minutia as the direction of the minutia, but distortion of a fingerprint image will cause that change of a gradient of the minutia is quite obvious. Therefore, the direction of the minutia in the conventional method is not stable. A method employed in embodiment 1 of the present disclosure is regional statistics, i.e., performing a statistics on gradient directions within a certain region around the minutia according to a gradient field to represent the direction of the minutia, as shown in FIG. 8, and the details are described as follows.

Step S311, selecting a statistical region. A circle region may be selected as the statistical region, such as defining a circle region with a radius of 5 pixels and centered at a minutia, or another noncircular region may be selected as required.

Step S312, calculating gradient directions of all minutiae within the statistical region. In order to obtain a gradient direction of a minutia, in embodiment 1 of the present disclosure, the direction of the minutia is obtained by calculating the directions of all minutiae within the region, i.e., calculating the gradient directions of all minutiae within the region.

Step S313, determining weights within the statistical region. After the gradient directions of all minutiae within the statistical region are obtained, according to a statistical theory, a point which is farther from a minutia has less influence on the minutia; otherwise, the influence is greater. Therefore, weighting process is performed on information within the statistical region according to the principle, such as using Gaussian weighting, i.e., performing weighting on the gradient directions of minutiae within the statistical region by using a Gaussian distribution centered at the minutia and with a radius of 5 pixels.

Step S314, performing a statistics on a gradient direction distribution within the statistical region. In order to perform the statistics on the gradient direction distribution within the statistical region, in embodiment 1 of the present disclosure, 360° is divided into six groups, i.e., 60° for each group, and then the gradient directions of all minutiae are counted in the six groups according to the gradient direction and weighted value of each minutia within the statistical region. The six groups of data represent statistical information of directions within the region.

Step S315, performing an interpolation operation on gradient distribution information. After the statistical information is obtained, since each group is 60°, only a scope of a minutia direction is obtained. In order to obtain an accurate minutia direction, an interpolation operation may be performed on the direction data group by using an interpolation algorithm to obtain a continuous direction distribution function.

Step S316, obtaining the minutia direction. A maximum value is obtained according to the obtained direction distribution function, and the maximum value is the direction of the minutia.

Figure 9:
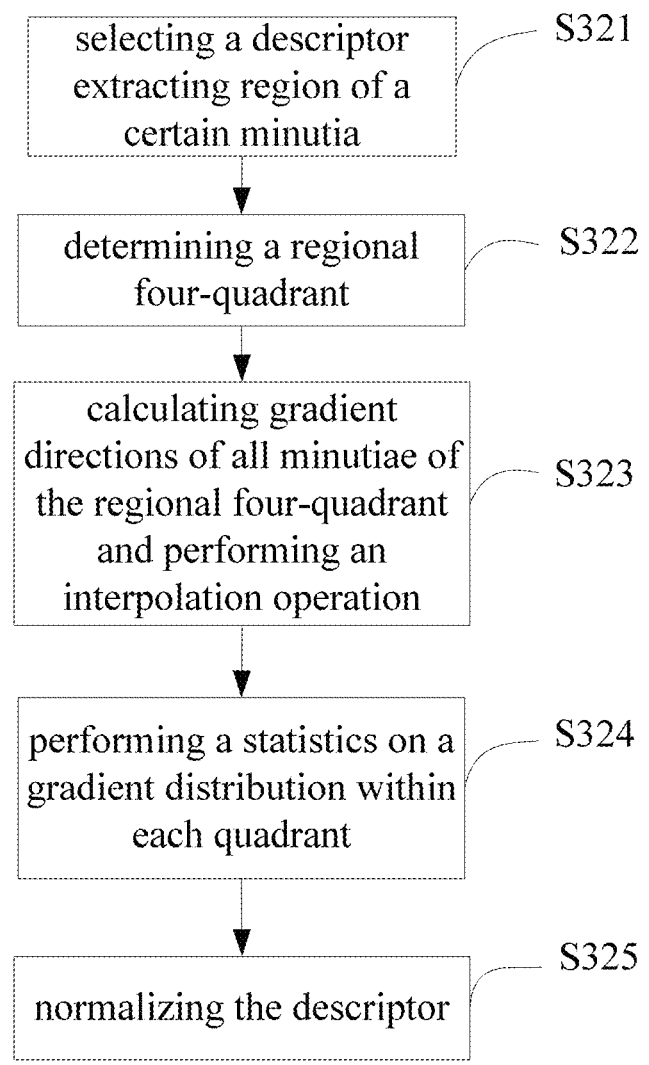
FIG. 9 is a flowchart of adding a descriptor in the method for fingerprint identification according to the first embodiment of the present disclosure.

Step S32, adding a descriptor with statistical significance for the minutia. Embodiment 1 of the present disclosure takes a four-quadrant gradient method as an example, as shown in FIG. 9, and specific steps are as follow.

Step S321, selecting a descriptor extracting region of a certain minutia. The extracting region may still employ a circular region, but it should be noted that an area of the circular region is larger than that of the region of the previous main gradient direction.

Figure 10:
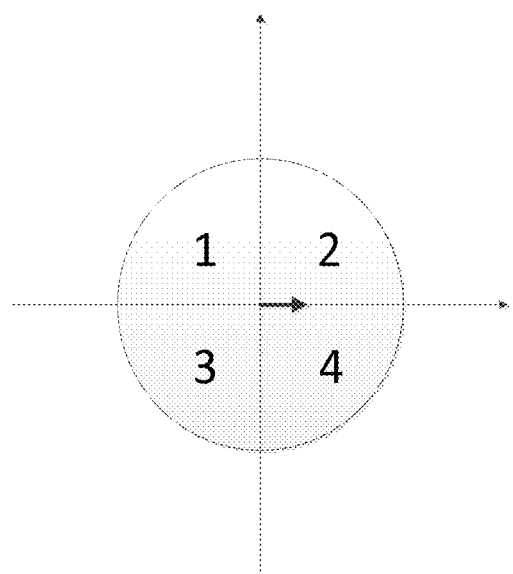
FIG. 10 is a schematic diagram of division of a quadrant in the method for fingerprint identification according to the first embodiment of the present disclosure.

Step S322, determining a regional four-quadrant according to the direction of the minutia determined in step S31. According to the above obtained direction of the minutia, the circular region may be divided. The direction of the minutia is taken as a positive direction of a horizontal axis, the minutia is an origin, and then the circular region is divided into four quadrants according to a dividing method of a plane rectangular coordinate system, and a rotation equation is as follows:

$$\begin{bmatrix} x' \\ y' \end{bmatrix} = \begin{bmatrix} \cos\theta & -\sin\theta \\ \sin\theta & \cos\theta \end{bmatrix} \begin{bmatrix} x \\ y \end{bmatrix},$$

where [x y] is an original coordinate, [x' y'] is a coordinate after rotating, and θ is a direction of the minutia. A quadrant dividing schematic diagram is shown in FIG. 10.

Figure 11:
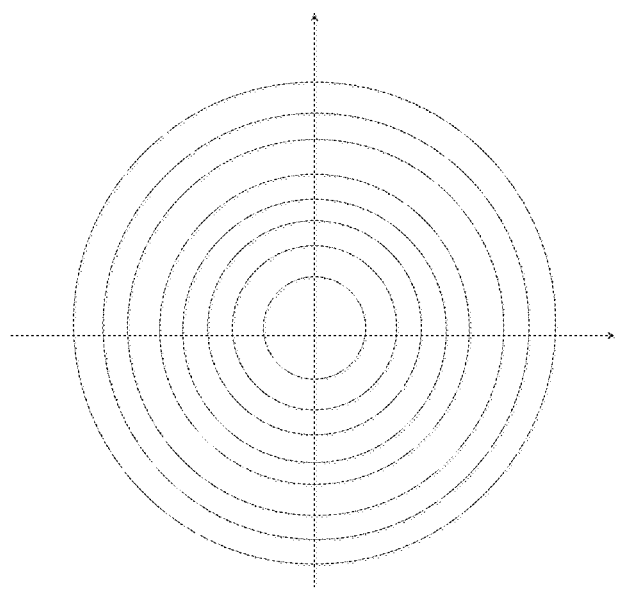
FIG. 11 is a schematic diagram of dividing a regional four-quadrant in the method for fingerprint identification according to the first embodiment of the present disclosure.

Step S323, calculating gradient directions of all minutiae of the regional four-quadrant and performing an interpolation operation. It should be noted herein that a gradient direction of each point should subtract a main gradient direction of the minutia, which is to ensure relativity. The interpolation operation is performed on the gradient direction, and taking that the circular region radius are eight pixel cells as an example, the circular region is further divided firstly as shown in FIG. 11. A dividing standard is that the circular region is divided according to concentric circles with radiuses of 1, 2, 3, 4, 5, 6 and 7 respectively. A point falling in the middle of the region needs to be interpolated on points of the adjacent two concentric circles.

Step S324, performing a statistics on a gradient distribution within each quadrant. The statistics of the gradient distribution is performed on a region that a quadrant is divided and an interpolation is completed, and a statistics method is same as the method of the pervious statistics of a direction of a minutia. After the gradient distribution of each quadrant is obtained, in accordance with the distribution of gradient direction within each quadrant, gradient direction distribution within all quadrants is recorded according to a sequence of 1, 2, 3, 4, and then the obtained gradient overall distribution forms a descriptor of the minutia.

Step S325, normalizing the descriptor. For convenience of the lateral matching, a normalization processing may be performed on the descriptor, so as to obtain a final descriptor. Assuming a descriptor before the normalization processing is:

$$W = (w_1 w_2 \ldots w_n);$$

a descriptor after the normalization processing is:

$$L = (l_1 \quad l_2 \quad \ldots \quad l_n),$$

$$\text{where, } l_i = w_i \Big/ \sqrt{\sum_{i=0}^{n} w_i^2}.$$

Step S33, extracting a triangle vertex direction.

Figure 12:
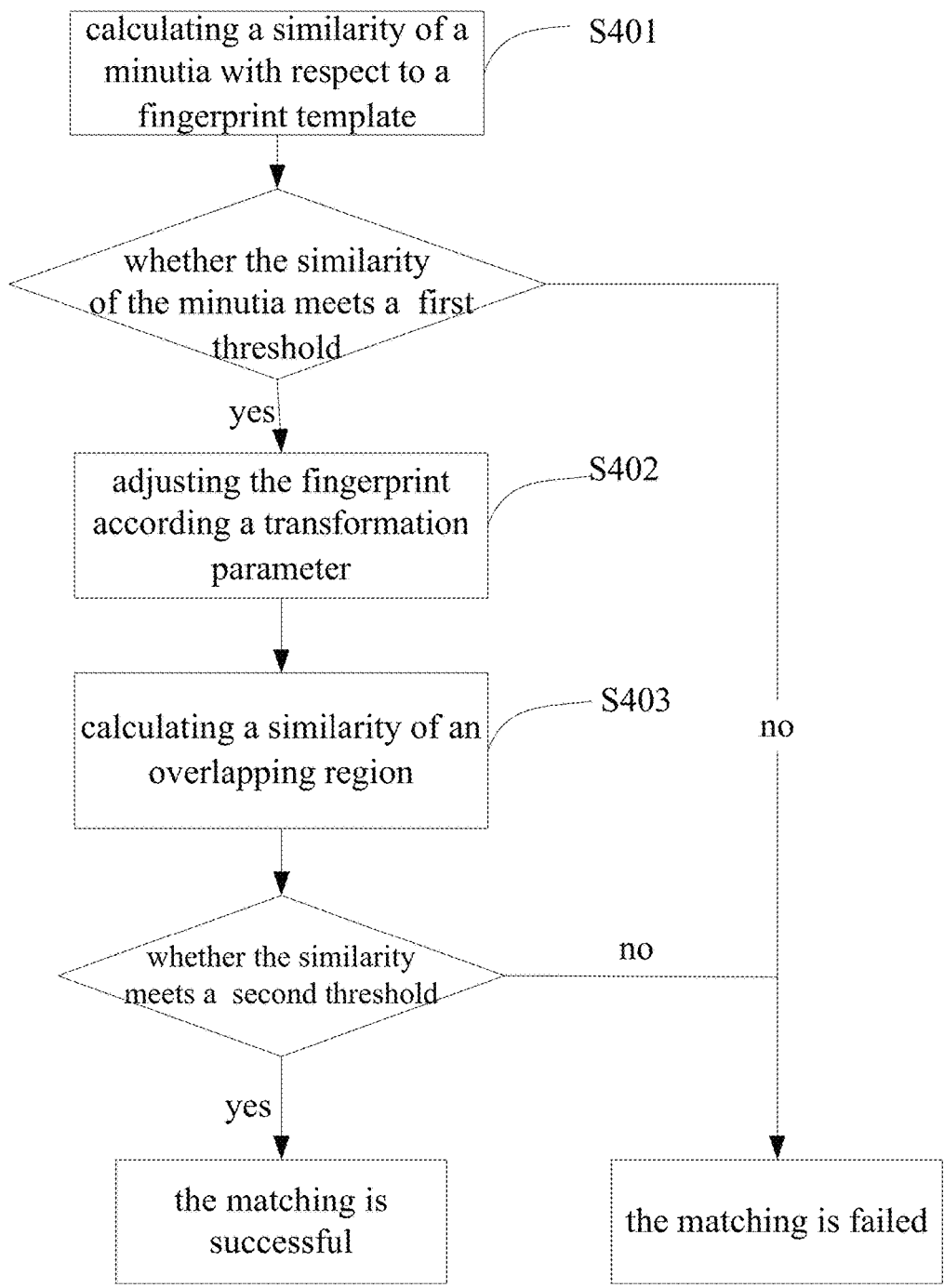
FIG. 12 is a flowchart of matching in the method for fingerprint identification according to the first embodiment of the present disclosure.

S4, performing fingerprint matching according to the extracted minutia to obtain a fingerprint identification result. For similarity of two fingerprint images, there are two standards: minutia similarity and image content similarity. Therefore, embodiment 1 of the present disclosure may employ steps shown in FIG. 12 for matching.

S401, calculating a similarity of a minutia with respect to a fingerprint template. The similarity of the minutia is determined comprehensively by using a mixture of multiple determination standards. Firstly, similarity matching of descriptors is performed. It may be seen from the previous descriptor forming process that a descriptor is expressed in manner of a vector, so that an Euclidean distance may be used to calculate the similarity of descriptors of two minutiae, i.e., $$D(a\ b) = \|a-b\|_2,$$

where a and b represent descriptors of two different minutiae. Since normalization processing has been performed on the obtained descriptors, the Euclidean distance is equivalent to an inner product operation:

$$D(a\ b) = \|a - b\|_2 = a \cdot b = \sum_{0}^{N-1} a_i b_i;$$

i.e., the smaller the inner product is, the more similar the two minutiae are. Therefore, for any pair of minutiae, a similar score of characteristic descriptors thereof may be calculated, and one score may be determined by performing a statistical calculation on a sum of similar scores of all minutia pairs. Secondly, a similarity of coordinate positions of the descriptors is calculated. The similarity of coordinate positions means that, if two images can be matched correctly after the images are transformed, same minutiae should exist in corresponding positions. That is to say, coordinates of the minutiae should be less than a certain value, so that similarity may be calculated according to a difference between the coordinates of the corresponding minutiae, i.e., calculating the difference of the coordinates of corresponding minutia pair. A score is determined according to a size of a difference, for example, it may be assumed that when the difference is 10, the score is 0, and when the difference is 9, the score is 1, and so on. Thirdly, a similarity of vertex directions around the descriptors is calculated. The above introduced calculation of directions of the minutiae is obtained by performing a statistics on gradient directions of all minutiae within a certain region, which has a strong stability, and a main direction of same minutiae shall be relocatable within a small range (considering distortion of a fingerprint image), so that the similarity may be calculated by calculating a difference of main gradient directions between the corresponding minutiae, and the implementation method is similar as the previous method. A statistics is performed on a total score of the above similarity to obtain the similarity of the minutia. When the similarity of the minutia meets a preset first threshold, step S402 is performed.

S402, adjusting the fingerprint according a preset transformation parameter.

S403, calculating a similarity of an overlapping region. The above matching algorithms are all based on a characteristic point of a minutia, i.e., a local characteristic point, and a biggest drawback of this method is too localized to matching by using global information, so that some inevitable mismatching may be increased. For example, two images are not similar in general, however, it may be seen that matching is successful and local parts of the two images are exactly similar, and thus false accepting occurs. As for such case, calculation of the similarity may be performed by taking the previous obtained gradient field and direction field as contents of the image. Firstly, an overlapping region of an input fingerprint image and a fingerprint template is calculated, and then a difference of the gradient field and a difference of the direction field of the overlapping region are calculated. Since an area of an overlapping region between the input image and a large splicing image can not be determined, the difference divides an overlapping pixel number to obtain an average difference, and the average difference may be taken as a standard of similarity of image contents.

Figure 13:
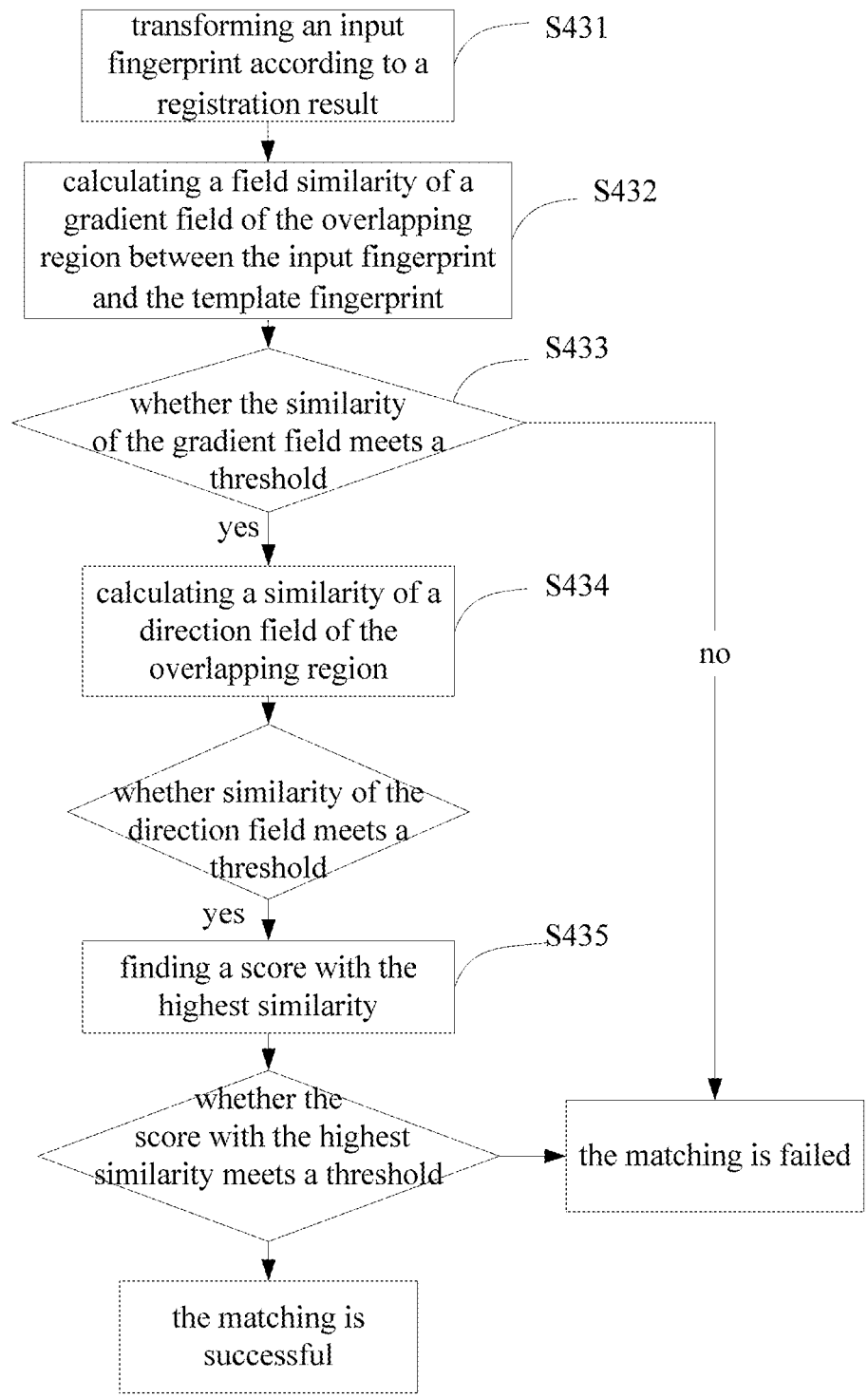
FIG. 13 is a flowchart of a similarity of image content in the method for fingerprint identification according to the first embodiment of the present disclosure.

The specific implementation is shown in FIG. 13, which includes steps as follows.

S431, firstly, transforming an input fingerprint according to a registration result. The result of registration is to obtain a rigid body transformation matrix H, and transformation is performed on the input fingerprint according to the matrix.

$$\begin{bmatrix} x' \\ y' \\ 1 \end{bmatrix} = H \begin{bmatrix} x \\ y \\ 1 \end{bmatrix},$$

where $[x\ y\ 1]^T$ is an original homogeneous coordinate of the input fingerprint, and $[x'\ y'\ 1]^T$ is a homogeneous coordinate obtained from transformation of the input fingerprint.

S432, calculating a field similarity of a gradient field of the overlapping region between the input fingerprint and the template fingerprint. A difference operation is performed on the gradient field of the overlapping region between a new fingerprint obtained from transformation and the template.

$$D(S\ T) = \left( \sum_{i=0}^{n} |s_i - t_i| \right) \bigg/ n,$$

where $s_i$ and $t_i$ represent a value of the gradient field of the overlapping region of the input fingerprint and the template fingerprint, respectively, and n represents a number of pixels of the overlapping region.

S433, determining whether the similarity of the gradient field meets a threshold. It is determined that whether a result obtained from the above step meets the threshold, if yes, a next step is performed; if no, current matching is failed.

S434, calculating a similarity of a direction field of the overlapping region between the input fingerprint and the template fingerprint, which is same as the calculation of the similarity of the gradient field, and determining whether the similarity of the direction field meets a threshold, if yes, continuing to next step; otherwise, current matching is failed.

S435, finding a score with the highest similarity. Similarity scores of the gradient field and the direction field are added to obtain a final matching similarity score. Since the previous image registration process employs an exhaustive registration of minutiae, i.e., trying all possibilities of the matching, similarity scores in each registration scheme are obtained. A score with the highest similarity may be eventually obtained according to different registration schemes, which may be taken as a final score of the input fingerprint and the template fingerprint, so as to determine that the input fingerprint and the template fingerprint are capable of matching correctly, according to which a result of fingerprint identification is obtained.

According to the method of embodiment 1 of the present disclosure, the direction of the minutia is calculated by using statistical information, the descriptor with statistical significance is added for the minutia, and during the matching process, calculation of the similarity of the minutia by using the descriptor and region matching by using information of the direction field and the gradient field of the overlapping region are added, therefore, instability and weak specificity of expression of fingerprint characteristics in a conventional algorithm are avoided, and accuracy of the fingerprint identification is improved.

Embodiment 2

Figure 14:
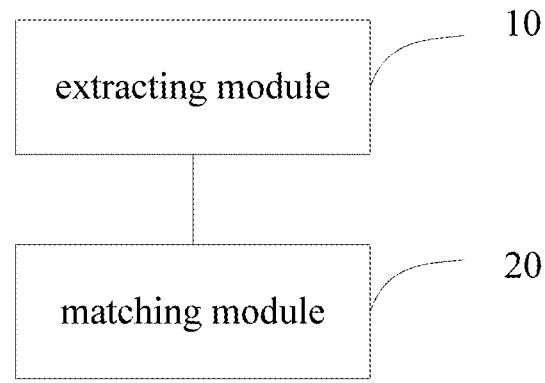
FIG. 14 is a structural diagram of an apparatus for fingerprint identification according to a second embodiment of the present disclosure.

Embodiment 2 of the present disclosure provides an apparatus for fingerprint identification. As shown in FIG. 14, the apparatus of embodiment 2 of the present disclosure includes:

an extracting module 10, configured to extract a minutia of an input fingerprint image by using a statistical method; and a matching module 20, configured to perform fingerprint matching according to the extracted minutia to obtain a fingerprint identifying result.

After the fingerprint image is input, the apparatus for fingerprint identification performs preprocessing on a fingerprint first. That is, preprocessing is performed on the input fingerprint image before a practical application, and the input fingerprint image is transformed into a desired form.

The details include:

calculation of an image field of the fingerprint.

In order to indentify a fingerprint part of the input image, the image field is first analyzed. The image field includes an intensity field, a gradient field and a direction field and the like. The so-called intensity field reflects information of brightness intensity of a certain point of a fingerprint image; the so-called gradient field is a direction that a function increases in a fastest speed, where the gradient is a vector and an expression of the gradient may be expressed as:

$$\nabla f = \left( \frac{\partial f}{\partial x}, \frac{\partial f}{\partial y} \right).$$

In the fingerprint image, the gradient illustrates a direction that a fingerprint line is steepest, an amplitude of the gradient may illustrate a degree that the fingerprint line is steepest, and a direction of the gradient refers to a direction of the fingerprint line. Line information of the whole fingerprint may be obtained by calculating the gradient field of the fingerprint image. The direction field reflects an intensity that the fingerprint revolves around a center, which is a quite important physical parameter in the fingerprint image.

Segmentation of the Fingerprint Image.

The segmentation of the fingerprint image means that fingerprint part is extracted from the fingerprint image, i.e., segmenting a background from a foreground of the fingerprint. Since the intensity field and the gradient field of the image have been calculated in step S21, the background and the foreground of the fingerprint may be distinguished by analyzing the intensity field and the gradient field.

Extracting Preparation of a Fingerprint Image Skeleton.

The so-called extracting preparation of the fingerprint image skeleton means to perform binarize on the image. Since a pixel difference between a texture and the background of the fingerprint image is relatively distinct, we may select a threshold δ, and as for a pixel on the fingerprint image:

$$B(i, j) = \begin{cases} 255 & f(i, j) >= \delta \\ 0 & f(i, j) < \delta \end{cases}.$$

Thinning of the fingerprint image skeleton. A general algorithm such as a thinning algorithm look-up table method or the like may be employed, and will not be repeated redundantly herein.

The fingerprint image obtained from preprocessing of the fingerprint is a fingerprint form on which minutia extracting may be performed. However, the whole image includes a lot of useless information, so that some minutiae with a typical characteristic, i.e., characteristic points, need to be extracted from the fingerprint image by using a method of characteristic extracting. A minutia is a quite typical fingerprint characteristic point and it has many types, such as a bifurcation point, an endpoint and a singular point and the like. For different types of minutiae, extracting methods are different. Taking an endpoint as an example, for extracting of the endpoint, as shown in FIG. 4, change of a pixel value of a fingerprint image is used. In FIG. 4, black pixel points are fingerprint lines of a fingerprint, and white pixel points are background part. It may be seen from FIG. 4 that, point A is an endpoint, so that one of eight pixel points in the neighborhood of the point A has a pixel value of 0. Since the whole image is a binary (0 or 255) image, an absolute value of a difference between adjacent pixels within a whole template is 0 or 255. Based on the above case, it may be seen that, a sum of the absolute values of the differences between adjacent pixels within the whole template is 2*255. However, if it is not an endpoint, as shown in FIG. 5, at least three pixel points with pixel value of 0 are included. Therefore, the endpoint of the image may be obtained by performing a statistics on a sum of differences between adjacent pixels within the neighborhood of each pixel point within the fingerprint image.

An extracting of a bifurcation point may use a same extracting strategy as that of the endpoint. It may be found by an analysis that, an image pixel distribution within a neighborhood of the bifurcation point of the fingerprint image is shown in FIG. 6, i.e., a bifurcation point where one line is bifurcated into three or more lines does not exist in a fingerprint of a person. It may be obtained by calculation that a sum of absolute values of differences between adjacent pixels within the neighborhood of A is 6*255, so that the bifurcation point may be obtained according to such character by traversing the whole image.

A singular point of a fingerprint includes two types: a triangle point and a center point. The singular point of the fingerprint does not have a local pixel distribution property as that of the endpoint and the bifurcation point. Extracting of the singular point is obtained by calculating a surrounding direction field, and will not be repeated redundantly herein.

Figure 15:
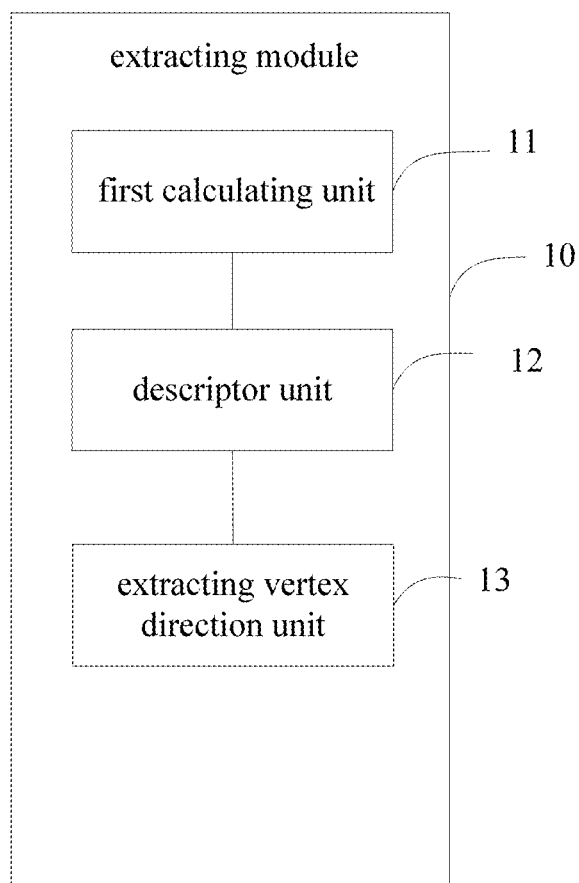
FIG. 15 is a structural diagram of an extracting module in the apparatus for fingerprint identification according to the second embodiment of the present disclosure.
Figure 16:
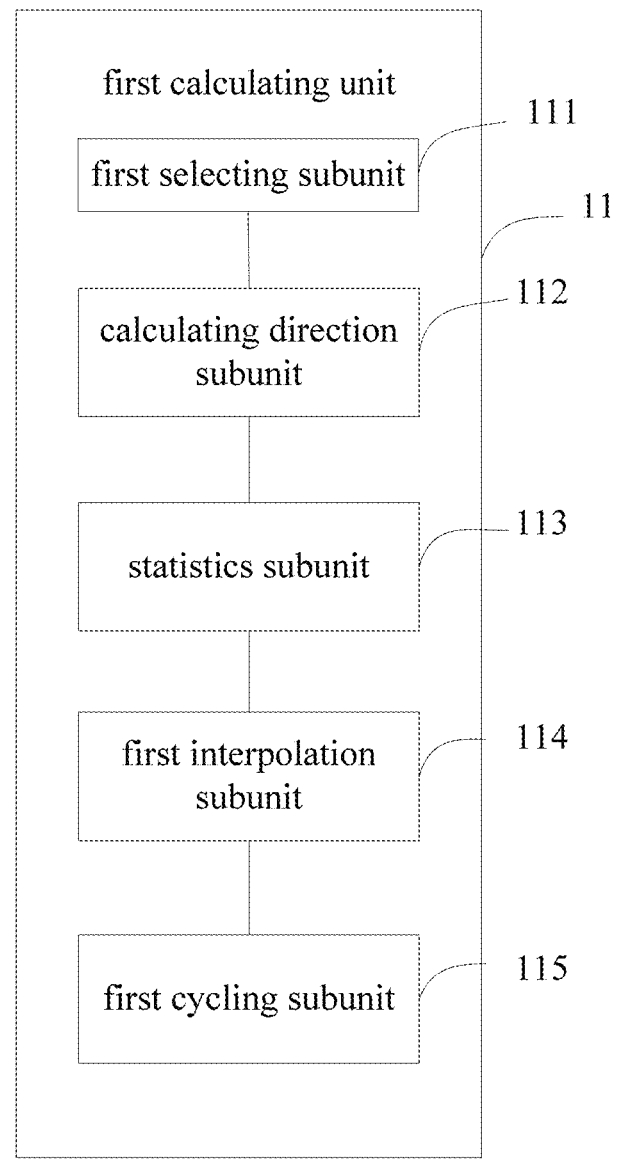
FIG. 16 is a structural diagram of a first calculating unit in the apparatus for fingerprint identification according to the second embodiment of the present disclosure.
Figure 17:
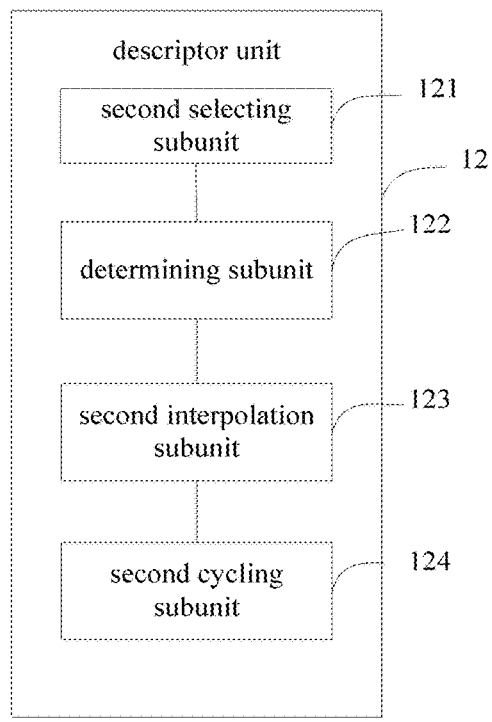
FIG. 17 is a structural diagram of a descriptor unit in the apparatus for fingerprint identification according to the second embodiment of the present disclosure.

An extracting module 10 is configured to extract a minutia of an input fingerprint image by using a statistical method. As shown in FIG. 15, the extracting module 10 includes a first calculating unit 11, configured to calculate a direction of the minutia by using regional statistical information; a descriptor unit 12, configured to add a descriptor with statistical significance for the minutia according to the direction of the minutia; and an extracting vertex direction unit 13, configured to extract a triangle vertex direction of the minutia. As shown in FIG. 16, the first calculating unit 11 includes a first selecting subunit 111, configured to select a statistical region of a certain minutia; a calculating direction subunit 112, configured to calculate and weight gradient directions of all minutiae within the statistical region; a statistics subunit 113, configured to perform a statistics on a gradient direction distribution of all the minutiae within the statistical region according to the gradient directions and weighted values of all the minutiae within the statistical region; a first interpolation subunit 114, configured to perform an interpolation operation according to the gradient direction distribution to obtain a direction distribution function; and a first cycling subunit 115, configured to find a maximum of the direction distribution function to obtain a direction of the minutia, and return to the step to select a statistical region of a certain minutia until all minutiae of the input fingerprint image are traversed. As shown in FIG. 17, a descriptor unit 12 includes a second selecting subunit 121, configured to select a descriptor extracting region of a certain minutia; a determining subunit 122, configured to determine a regional four-quadrant according to the descriptor extracting region and a direction of the minutia; a second interpolation subunit 123, configured to calculate gradient directions of all minutiae of the regional four-quadrant and perform an interpolation operation; and a second cycling subunit 124, configured to perform a statistics on a gradient distribution of the regional four-quadrant after the interpolation operation, form a descriptor of the minutia, and return to the step to select a descriptor extracting region of a certain minutia until all minutiae of the input fingerprint image are traversed.

In order to extract a descriptor and determine rotation of a splicing process subsequently, each minutia needs a stable direction. The so-called stable direction means a direction capable of representing a direction of the point. A conventional algorithm takes a gradient direction of a minutia as the direction of the minutia, but distortion of a fingerprint image will cause that change of a gradient of the minutia is quite obvious. Therefore, the direction of the minutia in the conventional method is not stable. In embodiment 2 of the present disclosure, a method employed by the extracting module 10 is regional statistics, i.e., performing a statistics on gradient directions within a certain region around the minutia according to a gradient field to represent the direction of the minutia, and the details are described as follows.

a first selecting subunit 111 selects a statistical region. A circle region may be selected as the statistical region, such as defining a circle region with a radius of 5 pixels and centered at a minutia, or another noncircular region may be selected as required. A calculating direction subunit 112 calculates directions of all minutiae within the statistical region. In order to obtain a gradient direction of a minutia, in embodiment 2 of the present disclosure, the direction of the minutia is obtained by calculating the directions of all minutiae within the region, i.e., calculating the gradient directions of all minutiae within the region. A statistics subunit 311 determines weights within the statistical region. After the gradient directions of all minutiae within the statistical region are obtained, according to a statistical theory, a point which is farther from a minutia has less influence on the minutia; otherwise, the influence is greater. Therefore, weighting process is performed on information within the statistical region by the statistics subunit 311 according to the principle, such as using Gaussian weighting, i.e., performing weighting on the gradient directions of minutiae within the statistical region by using a Gaussian distribution centered at the minutia and with a radius of 5 pixels. A first interpolation subunit 114 performs a statistics on a gradient direction distribution within the statistical region. In order to perform the statistics on the gradient direction distribution within the statistical region, the first interpolation subunit 114 divides 360° into six groups, i.e., 60° for each group, and then the gradient directions of all minutiae are counted in the six groups according to the gradient direction and weighted value of each minutia within the statistical region. The six groups of data represent statistical information of directions within the region. A first cycling subunit 115 performs an interpolation operation on gradient distribution information. After the statistical information is obtained, since each group is 60°, only a scope of a minutia direction is obtained. In order to obtain an accurate minutia direction, the first cycling subunit 115 may perform an interpolation operation on the direction data group by using an interpolation algorithm to obtain a continuous direction distribution function, and then find a maximum value according to the obtained direction distribution function, and the maximum value is the direction of the minutia.

A descriptor unit 12 adds the descriptor with statistical significance for the minutiae. Embodiment 2 of the present disclosure takes a four-quadrant gradient method as an example. The details include: a second selecting subunit 121 selects a descriptor extracting region of a certain minutia. The extracting region may still employ a circular region, but it should be noted that an area of the circular region is larger than that of the region of the previous main gradient direction. A determining subunit 122 determines a regional four-quadrant according to the direction of the minutia determined by the first calculating unit 11. The determining subunit 122 may divide the circular region according to the above obtained direction of the minutia. The direction of the minutia is taken as a positive direction of a horizontal axis, the minutia is an origin, and then the circular region is divided into four quadrants according to a dividing method of a plane rectangular coordinate system, and a rotation equation is as follows:

$$\begin{bmatrix} x' \\ y' \end{bmatrix} = \begin{bmatrix} \cos\theta & -\sin\theta \\ \sin\theta & \cos\theta \end{bmatrix} \begin{bmatrix} x \\ y \end{bmatrix},$$

where [x y] is an original coordinate, [x' y'] is a coordinate after rotating, and θ is a direction of the minutia. A quadrant dividing schematic diagram is shown in FIG. 10.

A second interpolation subunit 123 calculates gradient directions of all minutiae of the regional four-quadrant and performs an interpolation operation. It should be noted herein that a gradient direction of each point should subtract a main gradient direction of the minutia, which is to ensure relativity. The interpolation operation is performed on the gradient direction, and taking that the circular region radius are eight pixel cells as an example, the circular region is further divided firstly as shown in FIG. 11. A dividing standard is that the circular region is divided according to concentric circles with radiuses of 1, 2, 3, 4, 5, 6 and 7 respectively. A point falling in the middle of the region needs to be interpolated on points of the adjacent two concentric circles. The statistics of the gradient distribution is performed by a second cycling subunit 124 on a region that a quadrant is divided and an interpolation is completed, and a statistics method is same as the method of the pervious statistics of a direction of a minutia. After the gradient distribution of each quadrant is obtained, in accordance with the distribution of gradient direction within each quadrant, gradient direction distribution within all quadrants is recorded according to a sequence of 1, 2, 3, 4, and then the obtained gradient overall distribution forms a descriptor of the minutia. The second cycling subunit 124 may normalize the descriptor. For convenience of the lateral matching, the normalization processing may be performed on the descriptor, so as to obtain a final descriptor. Assuming a descriptor before the normalization processing is:

$$W = (w_1 w_2 \ldots w_n);$$

a descriptor after the normalization processing is:

$$L = (l_1 \quad l_2 \quad \ldots \quad l_n),$$

-continued where, $l_i = w_i / \sqrt{\sum_{i=0}^{n} w_i^2}$.

An extracting vertex direction unit 13 extracts a triangle vertex direction of the minutia.

Figure 18:
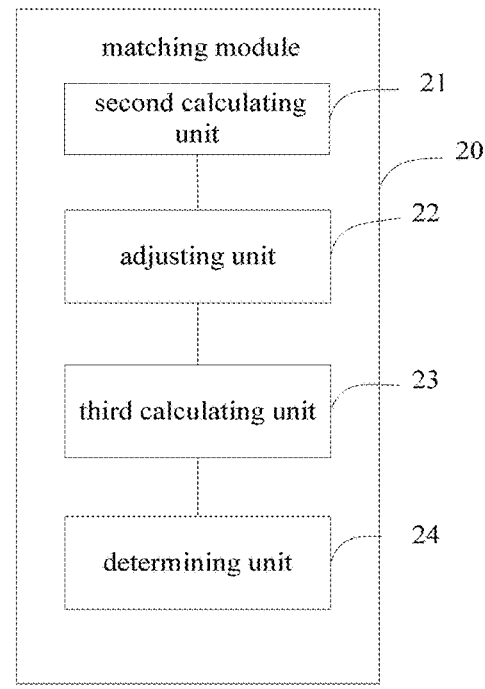
FIG. 18 is a structural diagram of a matching module in the apparatus for fingerprint identification according to the second embodiment of the present disclosure.

A matching module 20 performs fingerprint matching according to the extracted minutia to obtain a fingerprint identifying result. As shown in FIG. 18, the matching module 20 includes a second calculating unit 21, configured to calculate a similarity of minutia; an adjusting unit 22, configured to adjust a fingerprint image when the similarity of the minutia meets a preset first threshold; a third calculating unit 23, configured to calculate a similarity of an overlapping region; and a determining unit 24, configured to determine that the matching is successful when the similarity of the overlapping region meets a preset second threshold.

For similarity of two fingerprint images, there are two standards: minutia similarity and image content similarity. Therefore, the matching module 20 may employ the following manner for matching.

The second calculating unit 21 calculates a similarity of a minutia with respect to a fingerprint template. The similarity of the minutia is determined comprehensively by using a mixture of multiple determination standards. Firstly, similarity matching of descriptors is performed. It may be seen from the previous descriptor forming process that a descriptor is expressed in manner of a vector, so that an Euclidean distance may be used to calculate the similarity of descriptors of two minutiae, i.e., $$D(a\ b) = \|a-b\|_2,$$

where a and b represent descriptors of two different minutiae. Since normalization processing has been performed on the obtained descriptors, the Euclidean distance is equivalent to an inner product operation:

$$D(a\ b) = \|a-b\|_2 = a \cdot b = \sum_{0}^{N-1} a_i b_i;$$

i.e., the smaller the inner product is, the more similar the two minutiae are. Therefore, for any pair of minutiae, a similar score of characteristic descriptors thereof may be calculated, and one score may be determined by performing a statistical calculation on a sum of similar scores of all minutia pairs. Secondly, a similarity of coordinate positions of the descriptors is calculated. The similarity of coordinate positions means that, if two images can be matched correctly after the images are transformed, same minutiae should exist in corresponding positions. That is to say, coordinates of the minutiae should be less than a certain value, so that similarity may be calculated according to a difference between the coordinates of the corresponding minutiae, i.e., calculating the difference of the coordinates of corresponding minutia pair. A score is determined according to a size of a difference, for example, it may be assumed that when the difference is 10, the score is 0, and when the difference is 9, the score is 1, and so on. Thirdly, a similarity of vertex directions around the descriptors is calculated. The above introduced calculation of directions of the minutiae is obtained by performing a statistics on gradient directions of all minutiae within a certain region, which has a strong stability, and a main direction of same minutiae shall be relocatable within a small range (considering distortion of a fingerprint image), so that the similarity may be calculated by calculating a difference of main gradient directions between the corresponding minutiae, and the implementation method is similar as the previous method. A statistics is performed on a total score of the above similarity to obtain the similarity of the minutiae. When the similarity of the minutia meets a preset first threshold, the adjusting unit 22 adjusts the fingerprint according a preset transformation parameter. The third calculating unit 23 then calculates a similarity of an overlapping region. Since all the above matching algorithms are based on a characteristic point of a minutia, i.e., a local characteristic points, and a biggest drawback of this method is too localized to matching by using global information, so that some inevitable mismatching may be increased. For example, two images are not similar in general, however, it may be seen that matching is successful and local parts of the two images are exactly similar, and thus false accepting occurs. As for such case, calculation of the similarity may be performed by taking the previous obtained gradient field and direction field as contents of the image. Firstly, an overlapping region of an input fingerprint image and a fingerprint template is calculated, and then a difference of the gradient field and a difference of direction field of the overlapping region are calculated. Since an area of an overlapping region between the input image and a large splicing image can not be determined, the difference divides an overlapping pixel number to obtain an average difference, and the average difference may be taken as a standard of similarity of image contents.

The specific implementation of the third calculating unit 23 calculating a similarity of an overlapping region includes:

firstly, transforming an input fingerprint according to a registration result. The result of registration is to obtain a rigid body transformation matrix H, and transformation is performed on the input fingerprint according to the matrix.

$$\begin{bmatrix} x' \\ y' \\ 1 \end{bmatrix} = H \begin{bmatrix} x \\ y \\ 1 \end{bmatrix},$$

where $[x\ y\ 1]^T$ is an original homogeneous coordinate of the input fingerprint, and $[x'\ y'\ 1]^T$ is a homogeneous coordinate obtained from transformation of the input fingerprint.

Calculating a field similarity of a gradient field of the overlapping region between the input fingerprint and the template fingerprint. A difference operation is performed on the gradient field of the overlapping region between a new fingerprint obtained from transformation and the template.

$$D(S\ T) = \left(\sum_{i=0}^{n} |s_i - t_i|\right) / n,$$

where $s_i$ and $t_i$ represent a value of the gradient field of the overlapping region of the input fingerprint and the template fingerprint, respectively, and n represents a number of pixels of the overlapping region.

Determining whether the similarity of the direction field meets the threshold, if no, current matching is failed; if yes, a similarity of a direction field of the overlapping region between the input fingerprint and the template fingerprint is calculated, which is same as calculation of the similarity of the gradient field. It is determined that whether the similarity of the direction field meets the threshold, if no, current matching is failed; if yes, similarity scores of the gradient field and the direction field are added to obtain a final matching similarity score. Since the previous image registration process employs an exhaustive registration of minutiae, i.e., trying all possibilities of the matching, similarity scores in each registration scheme are obtained. A score with the highest similarity may be eventually obtained according to different registration schemes, which may be taken as a final score of the input fingerprint and the template fingerprint, so as to determine that the input fingerprint and the template fingerprint are capable of matching correctly, according to which a result of fingerprint identification is obtained.

According to the apparatus of embodiment 2 of the present disclosure, the direction of the minutia is calculated by using statistical information, the descriptor with statistical significance is added for the minutia, and during the matching process, calculation of the similarity of the minutia by using the descriptor and region matching by using information of the direction field and the gradient field of the overlapping region are added, therefore, instability and weak specificity of expression of fingerprint characteristics in a conventional algorithm are avoided, and accuracy of the fingerprint identification is improved.

The foregoing descriptions are merely preferred embodiments of the present disclosure, rather than limiting the present disclosure, and any modifications, equivalent substitutions, improvements and the like, made within the spirit and principle of the present disclosure, are all encompassed in the protection scope of the present disclosure.

INDUSTRIAL APPLICABILITY

According to the method of embodiment 1 of the present disclosure, the direction of the minutia is calculated by using statistical information, the descriptor with statistical significance is added for the minutia, and during the matching process, calculation of the similarity of the minutia by using the descriptor and region matching by using information of the direction field and the gradient field of the overlapping region are added, therefore, instability and weak specificity of expression of fingerprint characteristics in a conventional algorithm are avoided, and accuracy of the fingerprint identification is improved.

What is claimed is:

1. A method for fingerprint identification, comprising:
    extracting a minutia of an input fingerprint image by using a statistical method; and
    performing fingerprint matching according to the extracted minutia to obtain a fingerprint identification result;
    wherein the extracting the minutia of the input fingerprint image by using the statistical method comprises:
    calculating a direction of the minutia by using regional statistical information;
    adding a descriptor with statistical significance for the minutia according to the direction of the minutia; and
    extracting a triangle vertex direction of the minutia;
    wherein calculating the direction of the minutia by using the regional statistical information comprises:
    selecting a statistical region of a certain minutia;
    calculating and weighting gradient directions of all minutiae within the statistical region;
    performing a statistics on a gradient direction distribution of all the minutiae within the statistical region according to the gradient directions and weighted values of all the minutiae within the statistical region;
    performing an interpolation operation according to the gradient direction distribution to obtain a direction distribution function; and
    finding a maximum of the direction distribution function to obtain a direction of the minutia, and returning to the step of selecting a statistical region of a certain minutia until all minutiae of the input fingerprint image are traversed.

2. The method of claim 1, wherein the adding the descriptor with statistical significance for the minutiae comprises:
    selecting a descriptor extracting region of a certain minutia;
    determining a regional four-quadrant according to the descriptor extracting region and a direction of the minutia;
    calculating gradient directions of all minutiae of the regional four-quadrant and performing an interpolation operation; and
    performing a statistics on a gradient distribution of the regional four-quadrant after the interpolation operation, forming a descriptor of the minutia, and returning to the step of selecting a descriptor extracting region of a certain minutia until all minutiae of the input fingerprint image are traversed.

3. The method of claim 1, wherein the performing the fingerprint matching according to the extracted minutia comprises:
    calculating a similarity of the minutia;
    when the similarity of the minutia meets a preset first threshold, adjusting the fingerprint image;
    calculating a similarity of an overlapping region; and
    when the similarity of the overlapping region meets a preset second threshold, determining that the matching is successful.

4. An apparatus for fingerprint identification, comprising a processor,
    wherein the processor is configured to extract a minutia of an input fingerprint image by using a statistical method; and
    perform fingerprint matching according to the extracted minutia to obtain a fingerprint identifying result;
    wherein the processor is configured to calculate a direction of the minutia by using regional statistical information;
    add a descriptor with statistical significance for the minutia according to the direction of the minutia; and
    extract a triangle vertex direction of the minutia;
    wherein the processor is configured to select a statistical region of a certain minutia;
    calculate and weight gradient directions of all minutiae within the statistical region;
    perform a statistics on a gradient direction distribution of all the minutiae within the statistical region according to the gradient directions and weighted values of all the minutiae within the statistical region;
    perform an interpolation operation according to the gradient direction distribution to obtain a direction distribution function; and
    find a maximum of the direction distribution function to obtain a direction of the minutia, and return to the step to select a statistical region of a certain minutia until all minutiae of the input fingerprint image are traversed.

5. The apparatus of claim 4, wherein the processor is configured to select a descriptor extracting region of a certain minutia; determine a regional four-quadrant according to the descriptor extracting region and a direction of the minutia; calculate gradient directions of all minutiae of the regional four-quadrant and perform an interpolation operation; and perform a statistics on a gradient distribution of the regional four-quadrant after the interpolation operation, form a descriptor of the minutia, and return to the step to select a descriptor extracting region of a certain minutia until all minutiae of the input fingerprint image are traversed.

6. The apparatus of claim 4, wherein the processor is configured to calculate a similarity of minutia; adjust the fingerprint image when the similarity of the minutia meets a preset first threshold; calculate a similarity of an overlapping region; and determine that the matching is successful when the similarity of the overlapping region meets a preset second threshold.

* * * * *